United States Patent
Baddoo et al.

(10) Patent No.: US 9,169,018 B2
(45) Date of Patent: Oct. 27, 2015

(54) AIRCRAFT RADIO SYSTEM

(75) Inventors: Geoffrey James Akwei Baddoo, Reading (GB); Michael Naylor, Reading (GB); Andrew James Myers, Reading (GB)

(73) Assignee: Thales Holdings UK Plc, Addlestone Nr Weybridge, Surrey (GB)

( * ) Notice: Subject to any disclaimer, the term of this patent is extended or adjusted under 35 U.S.C. 154(b) by 0 days.

(21) Appl. No.: 13/579,915

(22) PCT Filed: Jan. 27, 2011

(86) PCT No.: PCT/GB2011/000111
§ 371 (c)(1),
(2), (4) Date: Nov. 14, 2012

(87) PCT Pub. No.: WO2011/101611
PCT Pub. Date: Aug. 25, 2011

(65) Prior Publication Data
US 2013/0190948 A1 Jul. 25, 2013

(30) Foreign Application Priority Data
Feb. 19, 2010 (GB) .................................. 1002889.2

(51) Int. Cl.
*G01C 23/00* (2006.01)
*B64D 11/00* (2006.01)
*H04B 7/185* (2006.01)

(52) U.S. Cl.
CPC ........ *B64D 11/0015* (2013.01); *H04B 7/18506* (2013.01)

(58) Field of Classification Search
USPC ............................................................ 701/3
See application file for complete search history.

(56) References Cited

U.S. PATENT DOCUMENTS 5,940,754 A * 8/1999 Servi .............................. 455/425
6,018,644 A * 1/2000 Minarik .......................... 455/82

(Continued)

FOREIGN PATENT DOCUMENTS

CA 2 681 434 A1 11/2008
EP 2 015 473 A2 1/2009

(Continued)

OTHER PUBLICATIONS

PCT Written Opinion of the International Searching Authority for PCT Counterpart Application No. PCT/GB2011/000111, 6 pgs., (May 30, 2011).

(Continued)

*Primary Examiner* — Hussein A. Elchanti
(74) *Attorney, Agent, or Firm* — Blakely, Sokoloff, Taylor & Zafman LLP

(57) ABSTRACT

An aircraft radio system comprising a plurality of radios interconnected by a digital communications network, each radio having a transceiver and a dedicated processor platform, the aircraft radio system being configured to cause the dedicated processor platforms to constitute a virtual processing environment for the aircraft radio system. There is also an aircraft radio system comprising a plurality of discrete radios interconnected by a digital communications network, each radio having a transceiver, a dedicated processor platform and a server configured to support communications over the network using PPPoE, Point to Point Protocol over Ethernet, to provide a common digital interface between an aircraft domain and the radios for plural types of communication.

17 Claims, 7 Drawing Sheets

(56) References Cited

U.S. PATENT DOCUMENTS

| | | |
|---|---|---|
| 7,158,072 B1 | 1/2007 | Venkatachalam et al. |
| 7,620,127 B1 | 11/2009 | Koenck et al. |
| 7,941,248 B1* | 5/2011 | Tsamis et al. ............ 701/3 |
| 8,351,926 B1* | 1/2013 | Wright et al. ............ 455/431 |
| 2002/0160773 A1 | 10/2002 | Gresham et al. |
| 2003/0069015 A1 | 4/2003 | Brinkley et al. |
| 2004/0147243 A1* | 7/2004 | McKenna ............ 455/403 |
| 2006/0030311 A1* | 2/2006 | Cruz et al. ............ 455/431 |
| 2006/0052094 A1 | 3/2006 | Kawabe et al. |
| 2008/0074322 A1 | 3/2008 | Ryba |
| 2009/0143924 A1* | 6/2009 | Griffith ............ 701/3 |
| 2009/0231197 A1 | 9/2009 | Richards |
| 2010/0037107 A1* | 2/2010 | Holzer ............ 714/714 |
| 2010/0167723 A1* | 7/2010 | Soumier et al. ............ 455/431 |
| 2011/0286325 A1* | 11/2011 | Jalali et al. ............ 370/221 |
| 2011/0320576 A1* | 12/2011 | Lauer et al. ............ 709/220 |
| 2012/0002639 A1* | 1/2012 | Lu et al. ............ 370/331 |
| 2012/0236785 A1* | 9/2012 | Lynch et al. ............ 370/316 |

FOREIGN PATENT DOCUMENTS

| | | |
|---|---|---|
| EP | 2 129 006 A2 | 12/2009 |
| JP | 2005527994 A | 9/2005 |
| JP | 2007519314 A | 7/2007 |
| JP | 2009223732 A | 10/2009 |
| WO | WO 02/101995 A1 | 12/2002 |
| WO | WO 2008/029053 A2 | 3/2008 |

OTHER PUBLICATIONS

PCT Notification concerning Transmittal of International Preliminary Report on Patentability (Chapter I of the Patent Cooperation Treaty) for PCT Counterpart Application No. PCT/GB2011/000111, 8 pgs., (Aug. 30, 2012).

Patents Act 1977: Search Report under Section 17 for corresponding United Kingdom Application No. GB1002889.2, 2 pages, (Jun. 8, 2010).

Patents Act 1977: Further Search Report under Section 17 for corresponding United Kingdom Application No. GB1002889.2, 1 page, (Dec. 22, 2010).

PCT International Search Report for PCT Counterpart Application No. PCT/GB2011/000111 containing Communication relating to the Results of the International Search Report, 4 pgs., (May 30, 2011).

Notification of Reason(s) for Rejection for corresponding Japanese Patent Application No. 2012-553382, 5 pages (including English translation), (Dec. 2, 2014).

* cited by examiner

AIRCRAFT RADIO SYSTEM

CROSS-REFERENCE TO RELATED APPLICATIONS

This patent application is a U.S. National Phase Application under 35 U.S.C. §371 of International Application No. PCT/GB2011/000111, filed Jan. 27, 2011, entitled AIRCRAFT RADIO SYSTEM, which claims priority to Great Britain Patent Application No. 1002889.2, filed Feb. 19, 2010.

FIELD

This invention relates to an aircraft radio system. More particularly, the invention relates to the integration of aircraft equipment that receives and/or transmits radio signals. The invention is not limited to any particular domain and it includes, for example, communication, navigation and surveillance systems. Further, it is not limited to equipment that receives and/or transmits radio signals that are external to the aircraft: it also includes equipment that deals with radio signals that are internal to the aircraft. Such equipment could include for example VHF radios (external), HF radios (external), Satcom radios (external), Distance Measuring Equipment radios (external), GPS receiver radios (external) and GSM picocell radios (internal).

The following terms are used herein:

aircraft domain—systems that are outside the radio systems such as the avionics systems, the cockpit and the cabin antenna system—antennae, RF cables and other items such as any amplifiers and filters that are external to radios radio—equipment that can receive and/or transmit radio signals, when connected to a suitable antenna system radio systems—a collection of radios, including any control functions avionics systems—a collection of avionics equipment transceiver—the RF and IF parts of a radio; it normally consists of a transmitter and a receiver, but can also be a transmitter only or a receiver only radio units—contain processing and transceiver functionality, but not for example, an antenna waveform—the physical layer and protocol layer behaviour meeting a particular air interface standard Satcom—satellite communications The following abbreviations are used herein:
ADC Analogue to Digital Converter
AFDX Avionics Full Duplex Ethernet
AMU Antenna Matching Unit
ARINC Aeronautical Radio, Inc
CORBA Common Object Request Broker Architecture
DAC Digital to Analogue Converter
DLNA Diplexer LNA
DME Distance Measuring Equipment
DVB Digital Video Broadcasting
FPGA Field Programmable Gate Array
GPS Global Positioning System
GSM Global System for Mobile Communications
HF High Frequency
HPA High Power Amplifier
HMI Human Machine Interface
IF Intermediate Frequency
IMA Integrated Modular Avionics
IMR Integrated Modular Radio
IP Internet Protocol
IPCP Internet Protocol Control Protocol
LCP Link Control Protocol
LNA Low Noise Amplifier
NCP Network-layer Control Protocol
OCXO Oven Controlled Crystal Oscillator
PADI PPPoE Active Discovery Initiation
PADO PPPoE Active Discovery Offer
PADR PPPoE Active Discovery Request
PADS PPPoE Active Discovery Session-confirmation
PADT PPPoE Active Discovery Termination
PCI Express Peripheral Component Interconnect Express
PDP Packet Data Protocol
PPPoE Point to Point Protocol over Ethernet
PROC Processor
PTT Push to Talk
SDU Satellite Data Unit
SIM Subscriber Identity Module
SRIO Serial RapidIO
TCVR Transceiver
TE Terminal Equipment
RF Radio Frequency
VHF Very High Frequency
VOIP Voice over IP

BACKGROUND

Existing avionics radio systems use separate radios for each function. These are often replicated to provide continuity of service on each frequency band required. This causes the size, weight and cost of such systems to be high. Furthermore each radio performs only the functions that it is specified to perform and there is little flexibility.

This situation was also true for other avionics systems. However the advantages of integrating the various avionics systems to run on a single computer were recognised and the Integrated Modular Avionics (IMA) approach was invented. This enables a reduction in the amount of computer hardware and also allows more flexibility in the way that the various functions can interact with each other. It does, however, introduce issues with certification because there is more potential for functions to interact in undesirable ways with possible catastrophic consequences. This has been overcome by using high integrity real time operating systems that isolate the various functions.

A system similar to the IMA would be advantageous for the avionics radio systems. However there are differences between the requirements that make the IMA approach less practical for such systems. This invention describes an alternative distributed approach to the IMA architecture that offers many of the desirable features without the disadvantages.

In addition, different interface schemes are currently employed to access the various radio services, which may be digital or analogue services. As the internal aircraft communications infrastructure becomes more and more IP based, it is desirable to have a single method for accessing all radio services, covering both modern IP based services and legacy analogue services.

Accordingly, each type of radio is currently implemented in a disparate manner, with little integration or commonality between them. Each type of radio currently tends to use its own interface methods. For example, the interface for a VHF radio carrying analogue voice is very different to the interface for a Satcom radio carrying IP packets. This makes it difficult to achieve a seamless networking solution where information can be easily routed across the system to the different radios. Additionally, it is currently not possible to create a virtual processing facility using the different radios.

The above considerations mean that current radio systems are not well integrated and so do not benefit from common designs, common interfaces and opportunities for collaboration through a virtual processing facility.

SUMMARY

The present invention is an aircraft radio system comprising a plurality of radios interconnected by a digital communications network, each radio having a transceiver and a dedicated processor platform, the aircraft radio system being configured to cause the dedicated processor platforms to constitute a virtual processing environment for the aircraft radio system.

The invention also provides an aircraft radio system comprising a plurality of radios interconnected by a digital communications network, each radio having a transceiver, a dedicated processor platform and a server configured to support communications over the network using PPPoE, Point to Point Protocol over Ethernet, to provide a common digital interface between an aircraft domain and the radios for plural types of communication.

The preferred embodiment of the invention consists of a collection of modular radio units with a high degree of commonality and interconnection, forming the basis for a distributed architecture. Radio units consist of transceiver modules and a common processing platform. Radio units only form a part of the overall radio equipment since they do not, for example, include antennas.

The common processing platform reduces development, manufacturing and maintenance costs by supporting, for example, a common software development environment, a common software execution environment, a greater degree of common software modules and a common interface.

The interconnection between radio units allows the creation of virtual processing facilities.

The common interface to the radio units supports seamless networking which eases the integration of the radio system into aircraft systems. A method of selecting a controller for seamless networking and radio management is also described below.

Using a distributed processing architecture offers advantages for scalability, certification, dynamic reconfiguration, seamless networking, redundancy management, size, cost and weight. Using seamless networking allows optimum routing of information over multiple radio services.

BRIEF DESCRIPTION OF THE DRAWINGS

In order that the invention may be better understood, a preferred embodiment of the invention will now be described, by way of example only, with reference to the accompanying schematic drawings, in which.

DETAILED DESCRIPTION

Figure 1:
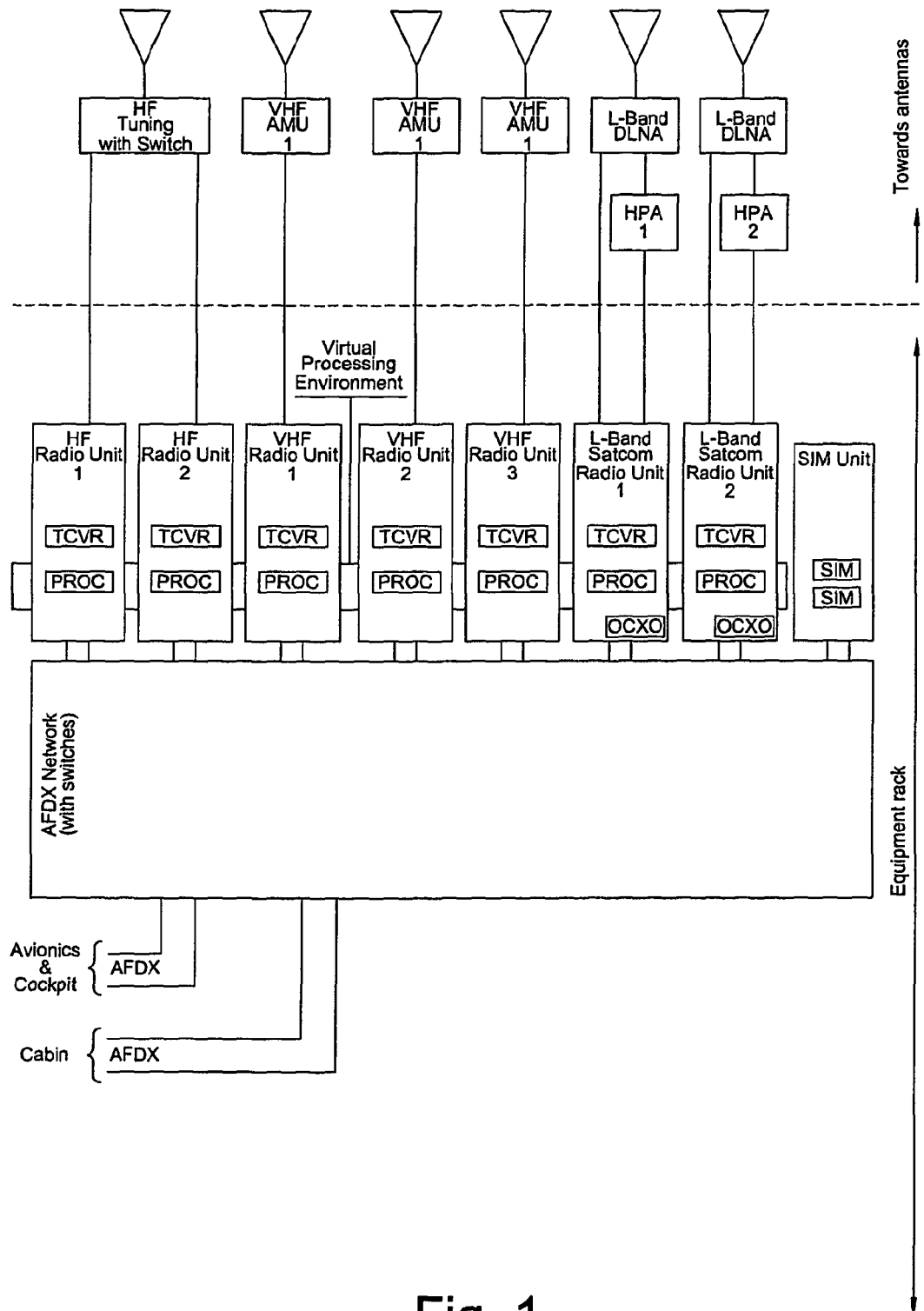
FIG. 1 is a block diagram of a virtual distributed processing architecture for an aircraft radio system embodying the invention.

A preferred embodiment of the invention will now be described from five aspects:—
- a virtual distributed processing architecture
- a virtual processing environment
- a common processing platform
- a common digital interface
- a method of selecting a controlling entity Virtual Distributed Processing Architecture The virtual distributed processing architecture is illustrated in FIG. 1. This shows a collection of radio units and associated items such as antennas, AMUs, DLNAs and HPAs. Radio units are connected together through a digital network such as an AFDX network.
  Background
    Avionics Full-Duplex Switched Ethernet, AFDX, is a deterministic networking technology developed for aeronautical applications. It is based on Ethernet, but avoids channel contention, in order to provide guaranteed bandwidths and quality of service. An AFDX network is made up of End Systems, Switches and Links. The architecture supports separate paths between End Systems, in order to provide redundancy.

Each radio unit contains a transceiver and a processing platform, and employs Software Defined Radio techniques. The processing platform carries out processing for its local transceiver, and also provides a virtual processing environment for more general processing such as seamless networking and radio management. If desired, it is also possible to run higher levels of a waveform protocol in the virtual processing environment. This virtual processing environment is enabled through the connectivity provided by the digital network.

Figure 2:
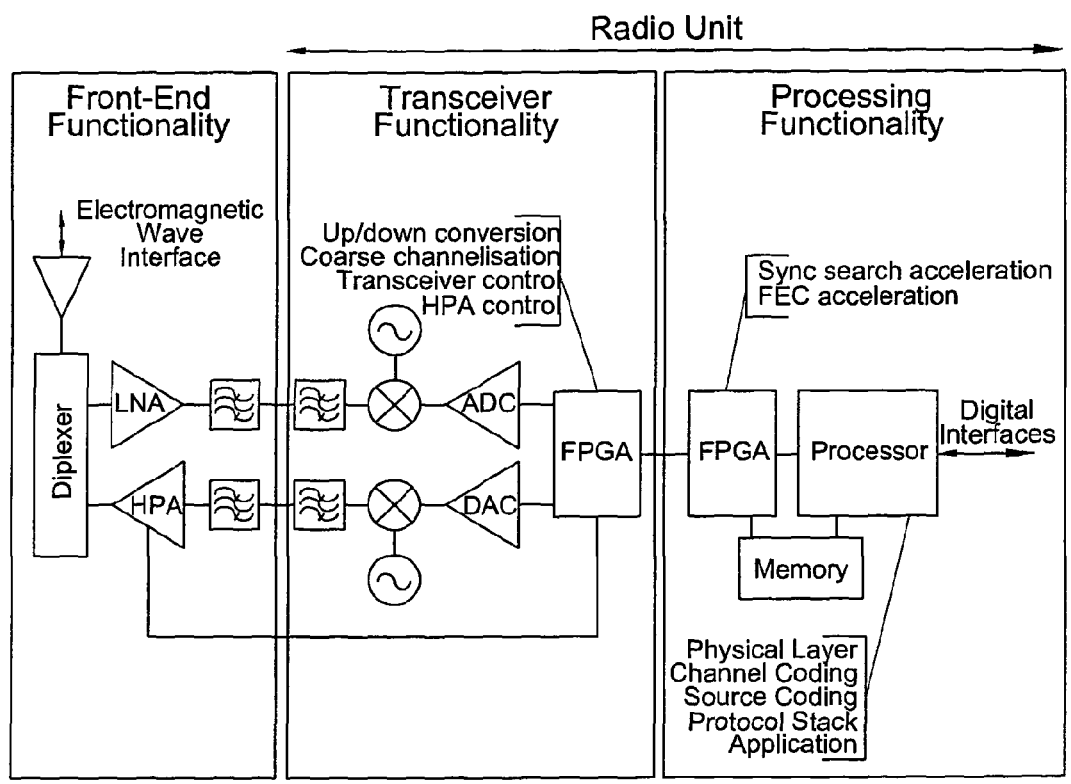
FIG. 2 is a block diagram illustrating the partitioning of radio functionality in a radio unit and its associated antenna and other components, for use in the embodiment of the invention.

An example illustration of the partitioning of functionality in a radio is given in FIG. 2. This also shows an example of the split between transceiver and processing functionality in a radio unit.

In addition to connectivity between radio units, the digital network also provides connectivity to other aircraft domains such as the avionics systems, the cockpit and the cabin. A SIM unit is also attached to the digital network, to support SIM cards that are required for some services.

Although the illustration shows a single system with connectivity to both the cockpit and cabin, an alternative configuration could achieve physical segregation by having one system supporting cockpit services and a separate system supporting cabin services.
  Virtual Processing Environment
    Background
      Current avionics communications systems use a federated approach where each radio contains its own digital signal processing and other software resources. This has the advantage of being more easily certified but is not very flexible in coping with new requirements.

Other avionics systems (e.g. flight control) are migrating to an Integrated Modular Avionics (IMA) architecture where common computing resources (suitably redundant) are used for many disparate functions. Interaction between functions is controlled using a certifiable RTOS that guarantees segregation in time and memory space. This offers much improved flexibility and better communications between applications than the federated approach. It also saves cost.

There is pressure to move towards a similar architecture for IMR. Although this is possible, it is not optimum from a cost, size and weight point of view because more equipment is required to perform the necessary functions and more interconnect is required. Scalability is a problem.

This idea is to gain the advantages of integrating processing resources with each radio unit but still offer the flexibility of the IMA.

The virtual processing environment is realised through the connectivity between the radio units and the use of technologies that support distributed processing. An example technology is CORBA, or an appropriate sub-set of CORBA to meet the required safety and security certification.

Background

The Common Object Request Broker Architecture, CORBA, is an open standard for distributed processing, and is defined by the Object Management Group, Inc, OMG. CORBA allows computer programs written in different computer software languages and hosted on different computers, connected by a network, to communicate with each other in a seamless fashion. Typically, a client program on one computer will use services provided by a server program on another computer. A possible alternative is Real-Time CORBA, also defined by OMG.

The virtual processing environment allows processing to be distributed across the system, thus increasing flexibility, redundancy and scalability. This is primarily of interest for non-waveform specific processing that is relevant to the whole system, and allows such processing to be deployed more easily and efficiently. Examples of such processing are seamless networking and radio management, including health management.

The virtual processing environment can be configured at design/build time, or at commissioning or at run-time.

Figure 3:
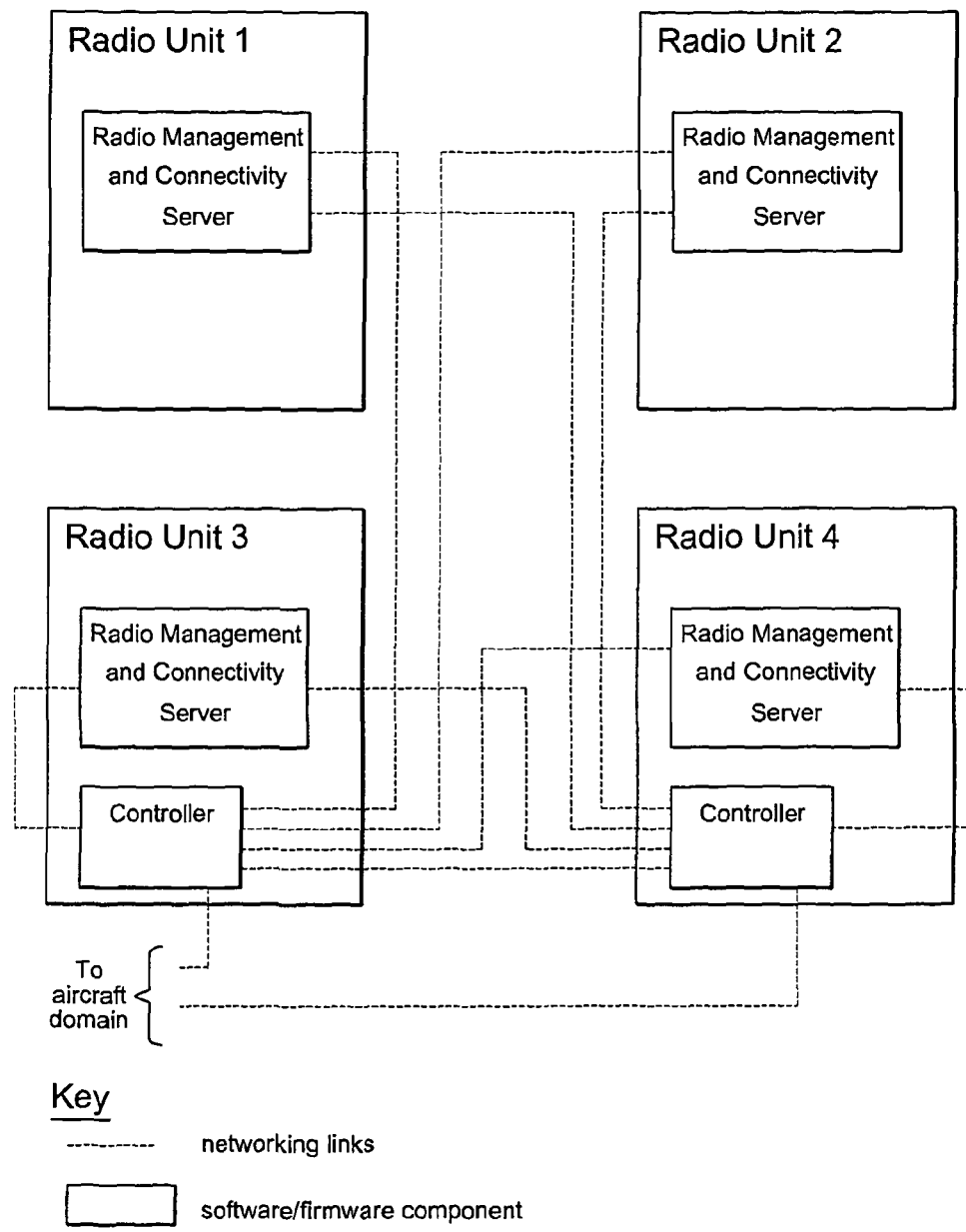
FIG. 3 is a block diagram illustrating the virtual processing environment with reference to the deployment of components relating to radio management and seamless networking, for use in the embodiment of the invention.

An example illustration of the deployment of software/firmware components for radio management and seamless networking in the virtual processing environment is given in FIG. 3. This illustration shows the Controller components located in radio units. However, it is also possible to locate them in separate entities such as an IMA computer. The latter is attractive if the Controller needs to be developed at a higher design assurance level than other components in the radio units.

Figure 4:
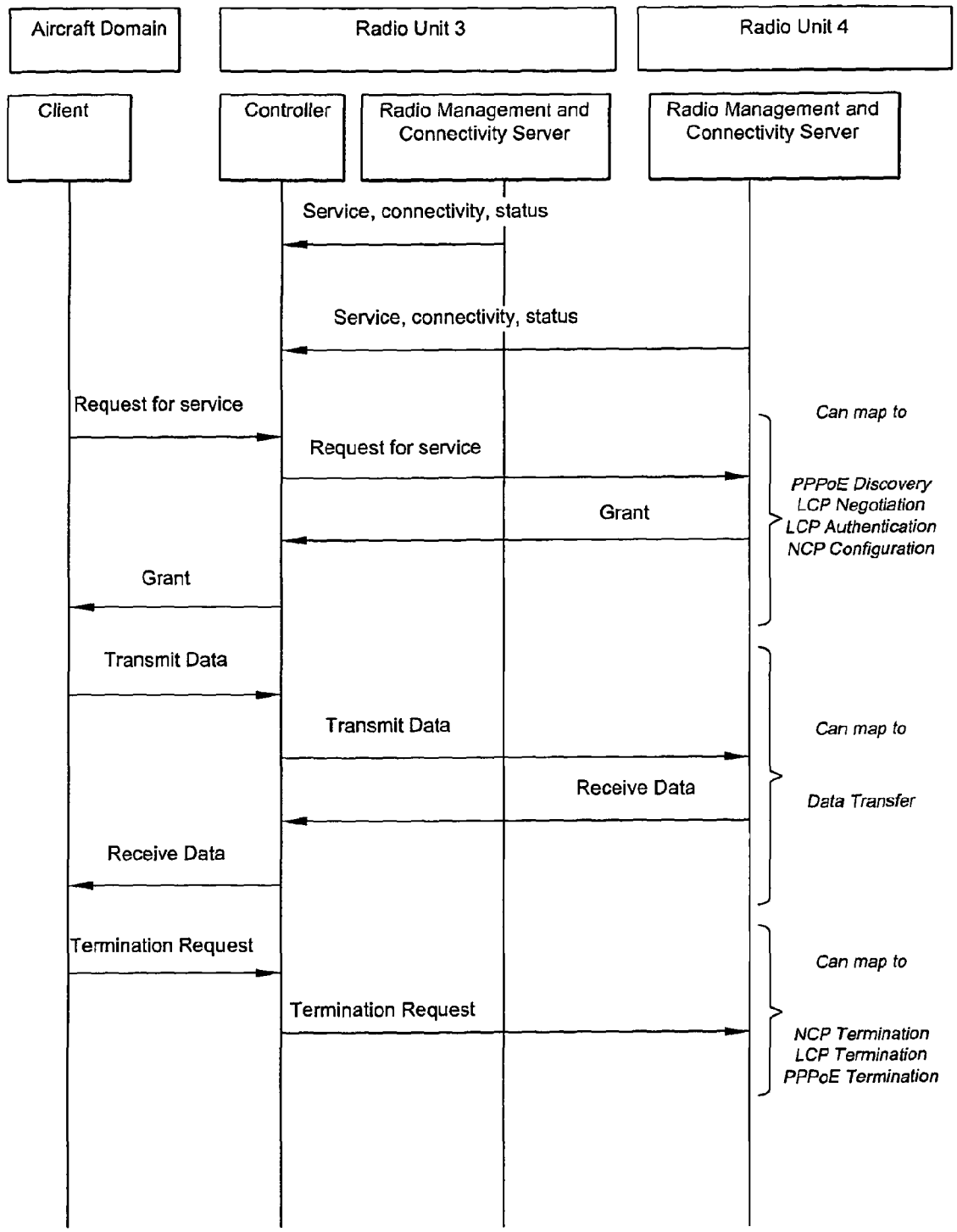
FIG. 4 is a message sequence chart illustrating the flow of information for radio management and seamless networking in the virtual processing environment, for use in the embodiment of the invention.

An example illustration of information exchange between components for radio management and seamless networking in the virtual processing environment is given in FIG. 4. This shows the essence of interactions, and also shows where the different parts can be mapped on to a PPPoE based realisation described in the common digital interface section.

However, although waveform processing is normally carried out on a processing platform local to the relevant transceiver, the virtual processing environment also allows this to be distributed if required. In addition to giving access to additional processing resources, this also gives flexibility to equipment suppliers in the amount of waveform specific functionality that is provided with radio units. For, example, a radio unit might be supplied with physical layer functionality only (modulation, demodulation and channel coding), leaving protocol stack functionality to be implemented elsewhere.

Figure 5:
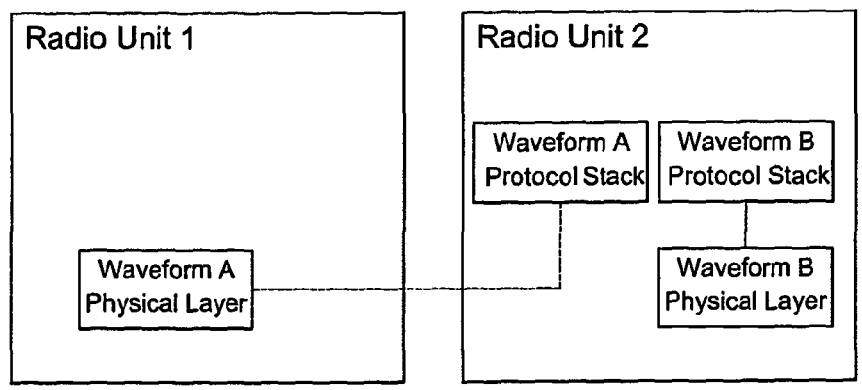
FIG. 5 is a block diagram illustrating the virtual processing environment with reference to the deployment of waveform components, for use in the embodiment of the invention.

An example illustration of the deployment of software/firmware components for waveform processing in the virtual processing environment is given in FIG. 5, showing how processing for a given waveform can be distributed across radio units.

Figure 6:
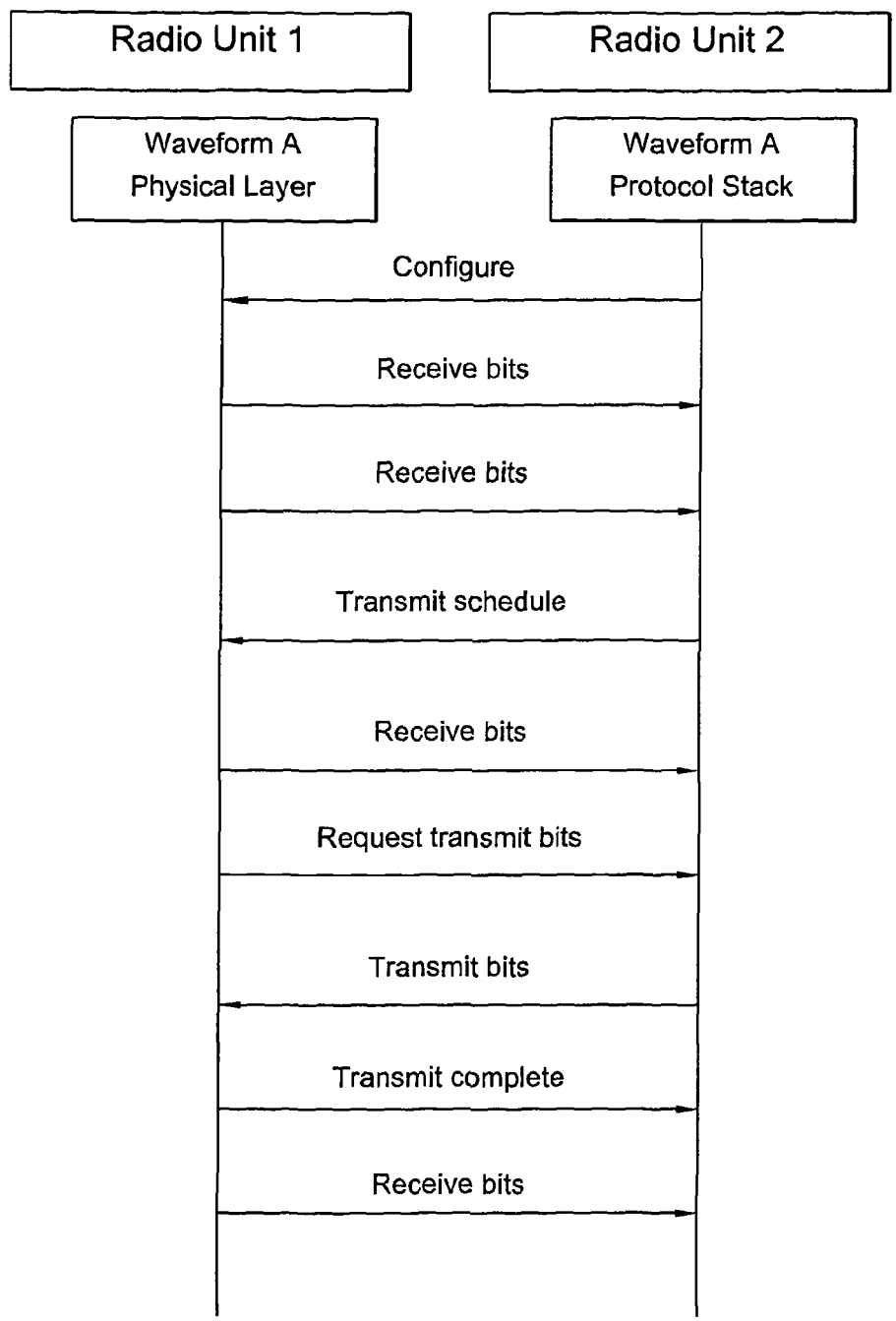
FIG. 6 is a message sequence chart illustrating the flow of information for distributed waveform components in the virtual processing environment, for use in the embodiment of the invention.

An example illustration of information exchange between components waveform processing in the virtual processing environment is given in FIG. 6. The illustration shows how the physical layer and protocol stack can be located in separate radio units.

A certifiable RTOS with time and memory space partitioning is used to keep the different processing applications separate. This, in conjunction with well-defined interfaces, eases certification.

To summarise, the virtual processing environment provides an optimised architecture for the next generation of communications avionics. It offers a high degree of flexibility, scalability, lower development cost and lower equipment cost.

Common Processing Platform

Background a) As a result of technology advancements, the size, weight and power consumption of digital processing hardware continually decreases. With today's technology, these items are a fraction of that required for some of the RF aspects of the radio system such as HPAs.

b) The overall development cost for wireless communications equipment is dominated by the cost of software and firmware development. However a significant proportion of this cost (typically>50%) is not specific to a particular waveform, but concerns generic items such as boot, inter process communications, logging services, timer services, drivers, built in test and so on.

c) Similar to size, weight and power consumption, the cost of digital processing hardware continually decreases as technology advances. The high overall development costs and the relatively low production quantities for avionics applications means that the hardware cost is a fraction of the overall development cost per production unit.

Although the virtual distributed architecture can be realised with disparate processing platforms, there are significant advantages in using a common processor platform throughout the system. This reduces development and maintenance costs, by leveraging the commonality that exists in the processing requirements of different radio units.

It is therefore attractive to deploy a common processing platform with each radio unit. Such processing will typically be realised on a processor and/or FPGA, thereby requiring the development of firmware and software. The common processing platform includes, for example, a common hardware platform, common interfaces, a common development environment and a common software execution environment.

One of the common interfaces would be Ethernet for AFDX connectivity. A common interface to transceiver modules is also desirable, for example PCI Express or SRIO, Serial RapidIO.

Background

PCI Express is a high speed interconnect technology, employing serial links. It is based on point to point links, but the architecture includes switches which allow links to be routed in a tree structure, and also fanned out to multiple receivers from a single transmitter, PCI Express is typically employed for chip to chip and board to board connections. The external cable specification also allows it to be employed in chassis to chassis connections.

Serial RapidIO, SRIO, is another high speed interconnect technology, also employing serial links. It is based on point to point links, but the architecture includes switches which allow links to be routed in a flexible manner. Serial RapidIO is typically employed for chip to chip and board to board connections.

The use of a common platform does not preclude the evolution of that platform over time. For example, version 1.0 might be deployed for a VHF radio and version 1.1 for an L-Band radio as well as an HF radio. The common platform can also come in multiple flavours supporting increasing processing capability. For example, one platform might only employ a processor, whereas another platform might employ a processor and an FPGA.

Common Digital Interface

Background

External wireless aircraft communications employ a variety of communication means including HF, VHF and Satcom. Different interface schemes are employed to access the various services, which may be based on digital or analogue methods. Meanwhile, as the internal aircraft communications infrastructure becomes more and more IP based, it is desirable to have a single method for accessing all wireless services, covering both modern IP based services and legacy analogue services.

Communication service requirements can generally be split into two types:

Type 1: Guaranteed latency and bandwidth—This is required for applications such as audio and video. This type has traditionally been provided through circuit-switched services, and more recently is also being provided by streamed packet services.

Type 2: Variable latency and bandwidth—This is suitable for applications such as Internet browsing or general data transfers where the latency is not critical and there is not a constant stream of information that must be delivered to the destination at a fixed rate. This type is provided by traditional packet switched services.

The virtual distributed processing architecture employs a digital network, such as AFDX, for radio unit interconnection and interfacing to client systems. ADFX is an example of a deterministic digital network. Such a network provides a Type 1 service with guaranteed latency and bandwidth. Providing the bandwidth of the digital network is higher than that offered by the radio services, the digital network can support both Type 1 and Type 2 radio services.

Background

AFDX networks currently use 10 Mbit/s and 100 Mbit/s Ethernet networks and so support rates much higher than most radio services, except for very high bandwidth radio services such as WiMAX and DVB, which are likely to use a significant proportion of the maximum AFDX bandwidth today. However, AFDX speeds are likely to increase in the future, following the evolution of Ethernet speeds.

Having established that a digital network can support both types of services, a method of establishing and clearing sessions needs to be provided.

Such a method is provided for satellite communications, using the Ethernet Interface defined in Attachment 5 of ARINC 781. This uses PPPoE to set up and clear down primary context connections across the satellite link. Once a primary context has been set up, secondary contexts can be set up using Telnet sessions.

Each context can be one of the following types:

Background class—this corresponds to the Type 2 service described above, with variable latency and bandwidth.

Streaming Class—this corresponds to the Type 1 service described above, with guaranteed latency and bandwidth.

The idea is to take the Ethernet interface of ARINC 781 (or a derivative) and combine it with a network such as AFDX to support all IMR radio services.

A number of examples are now provided:

a) IP Packets over Satcom background class IP service (employs PPPoE)

The client system uses PPPoE over AFDX to set up a session with a Satcom radio unit, requesting a background class. The Satcom radio unit establishes a primary context with a background class across the satellite link. IP packets from the client are sent over the Satcom link.

b) Voice over Satcom streaming class IP service (employs PPPoE)

The client system uses PPPoE over AFDX to set up a session with a Satcom radio unit, requesting a streaming class. The Satcom radio unit establishes a primary context with the streaming class across the satellite link. The client system regularly sends uncompressed digitised voice to the Satcom radio unit. The latter compresses the voice and sends it over the Satcom link using the streaming class.

c) Voice over analogue VHF (employs PPPoE)

Figure 7:
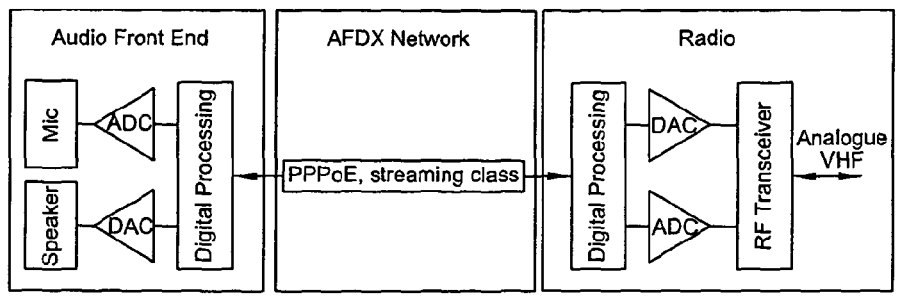
FIG. 7 is a block diagram illustrating a common digital interface established with a preferred embodiment of the invention, for transmitting analogue voice communications over PPPoE and AFDX, in accordance with an embodiment of the invention.

The client system uses PPPoE over AFDX to set up a session with a VHF radio unit, requesting a streaming class. This prepares the radio unit for transmission. The client system regularly sends uncompressed digitised voice to the VHF radio unit, which is transmitted on the VHF link. The latter uses the voice information to modulate the analogue VHF signal. This scenario is illustrated in FIG. 7.

d) Voice over Satcom streaming class IP service (employs PPPoE and Telnet)

The client system uses PPPoE over AFDX to set up a session with a Satcom radio unit, requesting a background class. The Satcom radio unit establishes a primary context with a background class across the satellite link. The client system uses Telnet to set up a secondary context with a streaming class. The client system regularly sends uncompressed digitised voice to the Satcom radio unit. The latter compresses the voice and sends it over the Satcom link using the streaming class.

e) Voice over analogue VHF (employs PPPoE and Telnet)

The client system uses PPPoE over AFDX to set up a session with a VHF radio unit, requesting a background class. The client system uses Telnet to 'set up' a secondary context with a streaming class. This prepares the radio for transmission. The client system regularly sends uncompressed digitised voice to the VHF radio unit, which is transmitted on the VHF link. The radio unit uses the voice information to modulate the analogue VHF signal. This scenario is illustrated in FIG. 7.

In the above examples, it may be observed that the client system behaves in an identical manner for example b) and example c), employing PPPoE. This illustrates how voice can be sent over very different links, using the same interface, thus simplifying the system. The same observation may be made for examples d) and e) which employ PPPoE and Telnet.

Figure 8:
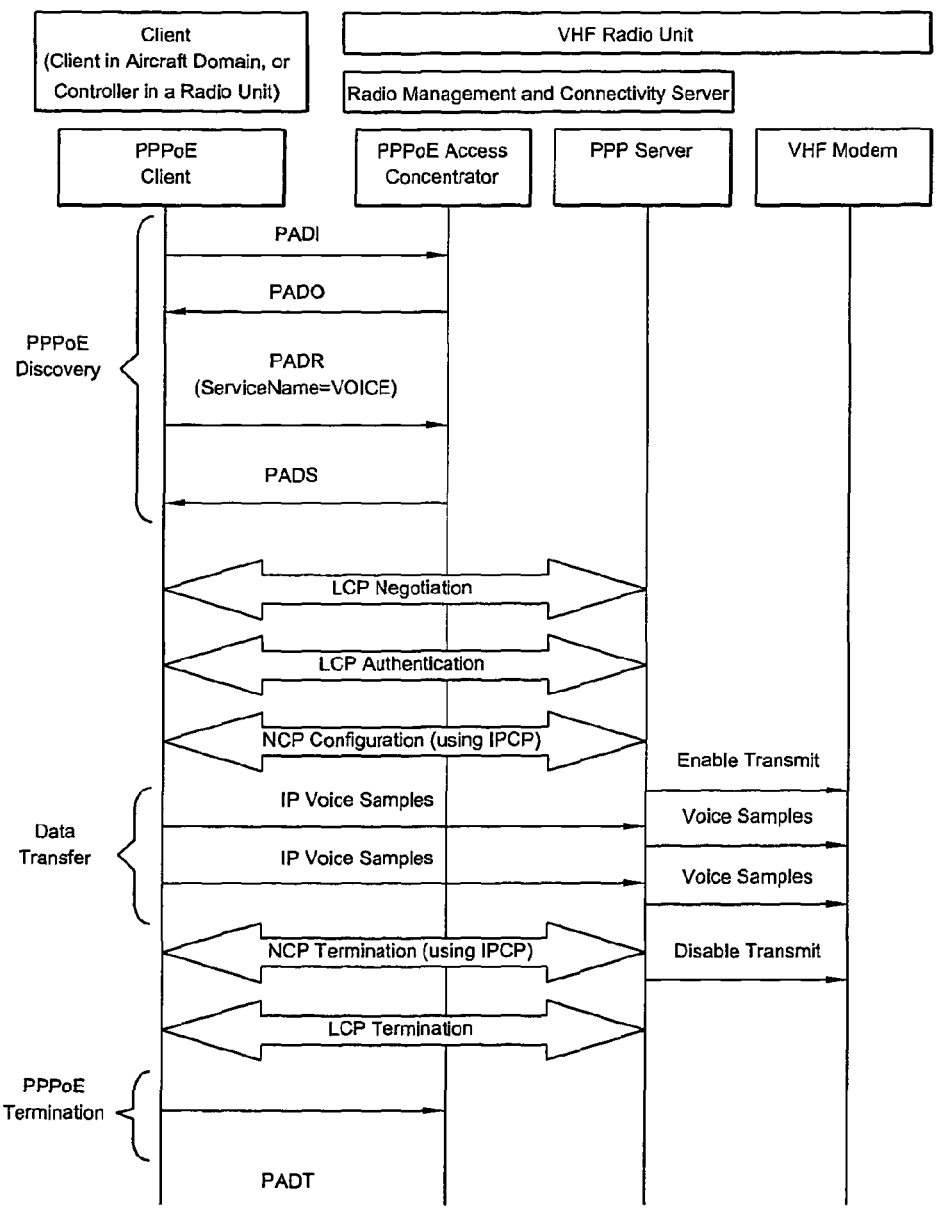
FIG. 8 is a message sequence chart illustrating the use of a common digital interface to access VHF analogue voice services.

An illustration of the information exchange to access VHF analogue services using PPPoE is given in FIG. 8. In this illustration, the client could be located in the aircraft domain, or could be the Controller for seamless networking in a radio unit.

The benefit from this is the use of a single digital interface to access all services provided by a variety of communication equipment. For example, HMI equipment in the cockpit can set up voice calls in the same way, regardless of whether voice will be carried over an analogue VHF system or a Satcom VOIP system.

To summarise, the common digital interface is achieved by combining the use of PPPoE and Telnet services with a network such as AFDX. This allows the interface to support
- background and streaming packet switched services (digital by definition)
- circuit switched services (analogue or digital).

A Method of Selecting a Controlling Entity

It is desirable to have a controlling entity that carries out radio management functions, and a controlling entity that supports seamless networking. If desired, a single controlling entity can carry out both functions.

Background

Seamless networking is the concept of transferring information over different communication links without the information source or destination needing to select the communication link that should be used. For example, a short message might be sent over a VHF data link when the aircraft is within VHF range, or may be sent over a Satcom link when the aircraft is out of VHF range—the desired link is selected automatically.

For the purpose of this description, a single entity termed a Controller supports both radio management and seamless networking functions.

It is often necessary to provide redundancy, in which case at least two Controllers must exist. As a result of architectural considerations and scalability considerations, even more than two Controllers can be deployed. There is then the need for a client system (e.g. the HMI in the cockpit) to select the Controller it should interface to. It is allowable for all Controllers to be active concurrently, thus providing redundancy and resilience.

A solution to the problem of selecting a Controller is now presented:

On commissioning, each Controller is assigned a number that indicates its priority level for selection. An example scenario is shown below, with an indication of which services each Controller has access to.

| Controller | Priority | Services |
| --- | --- | --- |
| 1 | 3 | HF, VHF |
| 2 | 2 | HF, VHF |
| 3 | 7 | HF, VHF, Satcom |
| 4 | 1 | HF, VHF, Satcom |

All the Controllers are connected to each other via a network (e.g. Ethernet based AFDX).

Each Controller periodically broadcasts information about the status of the services it can provide and its priority number. Such broadcasts might be on Ethernet packets or IP packets. A Controller also broadcasts the same information for each of the other Controllers it can hear, thus providing information on its overall connectivity.

Each Controller computes a metric that indicates the level of overall connectivity of each Controller, using a suitable algorithm. Such an algorithm can weight each service in an appropriate manner (for example, VHF services will currently be more important than HF or Satcom services). The Controllers broadcast this information to client systems on a regular basis.

The client systems rank Controllers in order of the highest metric. If more than one Controller shares the same metric, then the priority level at commissioning is used to differentiate the ranking.

The client systems can then select a Controller to use, based on ranking. For example, the pilot's HMI system could select the top-ranking Controller, whereas the co-pilot's HMI system could select the second ranking Controller. This scheme provides full redundancy.

There are further fail-safe measures that can be provided:
- users can manually switch between Controllers
- users can switch from a seamless networking mode to a manual mode, where for example, VHF, HF or Satcom are explicitly selected.

The invention may be implemented through hardware, firmware and software. It preferably employs Software Defined Radio techniques.

In the example of FIG. 1, each radio has a discrete module consisting of a transceiver and a processor platform, and preferably the processor platforms have a common architecture, which may be their hardware architecture and/or their interfaces and/or their development environment and/or their software execution environment. However, the processor platforms may alternatively be shared by two or more radio transceivers, i.e. they may be dedicated to plural transceivers. Also, the hardware may be organised differently, so that for example the dedicated processor platforms are grouped in a module, for example a collection of processing cards, separate from the transceivers.

What is claimed is:

1. An aircraft radio system comprising:
a plurality of radios, each radio having a transceiver and a dedicated processor platform to carry out waveform processing for the transceiver;
the dedicated processor platforms being interconnected to one another through a digital communications network such that the dedicated processor platforms constitute a virtual processing environment for the aircraft radio system,
wherein, within the virtual processing environment, processing of an individual waveform received by a first one of the transceivers is distributed across at least two of the dedicated processor platforms, such that the processing of the individual waveform is carried out in part by the processor platform dedicated to the first one of the transceivers and in part by one or more of the processor platforms that are dedicated to other ones of the transceivers.

2. The system according to claim 1, wherein at least one of the dedicated processor platforms is dedicated to two or more of the transceivers.

3. The system according to claim 1, wherein two or more of the dedicated processor platforms are grouped in a module separate from the transceivers.

4. The system according to claim 1, wherein the network is a deterministic network.

5. The system according to claim 1, wherein the network is an Ethernet network.

6. The system according to claim 1, wherein the virtual processing environment complies with at least one of Common Object Request Broker Architecture (CORBA) or Real-Time CORBA.

7. The system according to claim 1, wherein at least one of the radios employs Software Defined Radio techniques.

8. The system according to claim 1, wherein the system is configured to cause two or more of the dedicated processor platforms to constitute a virtual processing environment for seamless networking over multiple possible radio channels.

9. The system according to claim 1, wherein the system is configured to cause two or more of the dedicated processor platforms to constitute a virtual processing environment for radio management.

10. The system according to claim 1, wherein the dedicated processor platforms have a common architecture, including at least one of: a common hardware architecture; common interfaces; a common development environment; or a common software execution environment.

11. The system according to claim 1, wherein each radio comprises a transceiver module interfacing with the dedicated processor platform via an interface common to the radios.

12. The system according to claim 1, further comprising:
a server configured to support communications over the network using Point to Point Protocol over Ethernet (PPPoE) to provide a common digital interface between an aircraft domain and the radios for plural types of communication.

13. The system according to claim 1, further comprising at least one controller interfacing with the network, each controller being configured to determine its own overall connectivity and to broadcast this over the network to allow client systems to select a controller for use, based on the ranking of connectivities.

14. The system according to claim 13, wherein each controller is configured to determine its connectivity based on the type of radio service it is able to offer and a priority level established and stored when the aircraft radio system is commissioned or configured.

15. The system according to claim 1, further comprising a plurality of antenna systems each connected to a respective radio by a Radio Frequency (RF) cable link.

16. The system according to claim 1, further comprising:
cabin and cockpit human-machine interfaces and avionics interfaces, interconnected with the plurality of radios through the digital communications network.

17. The system according to claim 4, wherein the deterministic network is an Avionics Full Duplex Ethernet (AFDX) network.

* * * * *